United States Patent [19]
Nakamura et al.

[11] Patent Number: 5,774,687
[45] Date of Patent: Jun. 30, 1998

[54] CENTRAL PROCESSING UNIT DETECTING AND JUDGING WHETHER OPERATION RESULT EXECUTED BY ALU IN RESPONSE TO A FIRST INSTRUCTION CODE MEETS A PREDETERMINED CONDITION

[75] Inventors: Kazuo Nakamura; Hideo Matsui, both of Hyogo, Japan

[73] Assignee: Mitsubishi Denki Kabushiki Kaisha, Tokyo, Japan

[21] Appl. No.: 483,064

[22] Filed: Jun. 7, 1995

[30] Foreign Application Priority Data

Sep. 26, 1994 [JP] Japan .................................. 6-229618

[51] Int. Cl.⁶ .................................................. G06F 9/00
[52] U.S. Cl. ......................... 395/387; 395/390; 395/391; 395/392
[58] Field of Search .................................. 395/387, 390, 395/391, 392, 571, 581

[56] References Cited

U.S. PATENT DOCUMENTS

| | | | |
|---|---|---|---|
| 3,766,527 | 10/1973 | Briley | 395/375 |
| 4,413,323 | 11/1983 | Muller | 395/521 |
| 5,177,701 | 1/1993 | Iwasa | 364/736 |
| 5,193,167 | 3/1993 | Sites et al. | 395/490 |
| 5,410,682 | 4/1995 | Sites et al. | 395/800 |
| 5,537,560 | 7/1996 | Boggs et al. | 395/375 |
| 5,568,624 | 10/1996 | Sites et al. | 395/375 |

OTHER PUBLICATIONS

A fine–grained MIMD architecture based upon register channels by Gupta, 1992 IEEE publication, pp. 28–37, Nov. 1992.

*Primary Examiner*—William M. Treat
*Assistant Examiner*—Zarni Maung
*Attorney, Agent, or Firm*—McDermott, Will & Emery

[57] ABSTRACT

A central processing unit in a microprocessor, or the like, executes at high speed a simple program and sets a different immediate depending on a true or false state of a predetermined condition. In the central processing unit, the first and second immediates are set in the instruction code, which is prefetched by an instruction queue. Depending on whether a value of one or zero is stored in the zeroflag, which corresponds to the true or false state of the predetermined condition, the first or second immediate is written into an address location of the register or the memory designated by the same instruction code.

21 Claims, 3 Drawing Sheets

FIGURE 2

| FIRST LINE | CMP | VAR, NUM |
| --- | --- | --- |
| SECOND LINE | MOV | R0, IMM1, IMM2 |
| THIRD LINE | MOV | PORT, R0 |

FIGURE 3

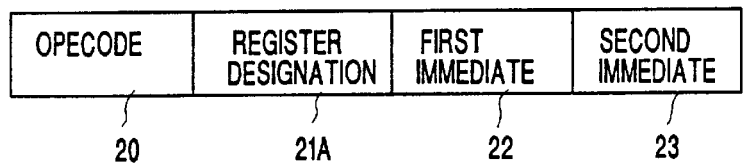

| OPECODE | REGISTER DESIGNATION | FIRST IMMEDIATE | SECOND IMMEDIATE |
| --- | --- | --- | --- |
| 20 | 21A | 22 | 23 |

FIGURE 4

| FIRST STEP | • TRANSFER THE FIRST IMMEDIATE FROM THE INSTRUCTION QUEUE TO THE DESTINATION REGISTER.<br>• FORWARD TO THE THIRD STEP WHEN THE ZEROFLAG IS ONE, OR FORWARD TO THE NEXT STEP WHEN THE ZEROFLAG IS ZERO. |
| --- | --- |
| SECOND STEP | • TAKE OUT THE SECOND IMMEDIATE TO THE DESTINATION REGISTER. |
| THIRD STEP | • TAKE OUT THE OPECODE OF THE NEXT INSTRUCTION FROM THE INSTRUCTION QUEUE TO THE MACRO INSTRUCTION DECODER.<br>• END OF THE INSTRUCTION. |

FIGURE 5

| FIRST LINE | CMP | VAR, NUM |
| --- | --- | --- |
| SECOND LINE | MOV | PORT, IMM1, IMM2 |

FIGURE 6

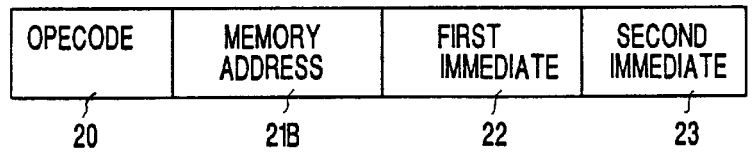

| OPECODE | MEMORY ADDRESS | FIRST IMMEDIATE | SECOND IMMEDIATE |
| --- | --- | --- | --- |
| 20 | 21B | 22 | 23 |

| | |
|---|---|
| FIRST STEP | • TRANSFER THE MEMORY ADDRESS PORTION FROM THE INSTRUCTION QUEUE TO THE MEMORY ADDRESS REGISTER.<br>• FORWARD TO THE NEXT STEP. |
| SECOND STEP | • TRANSFER THE FIRST IMMEDIATE TO THE MEMORY DATA REGISTER.<br>• FORWARD TO THE FOURTH STEP WHEN THE ZEROFLAG IS ONE, OR FORWARD TO THE NEXT STEP WHEN THE ZEROFLAG IS ZERO. |
| THIRD STEP | • TRANSFER THE SECOND IMMEDIATE TO THE MEMORY DATA REGISTER.<br>• FORWARD TO THE NEXT STEP. |
| FOURTH STEP | • TRANSFER THE CONTENT OF THE MEMORY DATA REGISTER TO THE EXTERNAL MEMORY OR REGISTER OF WHICH ADDRESS IS DESIGNATED BY THE MEMORY ADDRESS REGISTER. |
| FIFTH STEP | • TAKE OUT THE OPECODE OF THE NEXT INSTRUCTION FROM THE INSTRUCTION CUE TO THE MACRO INSTRUCTION DECODER.<br>• END OF THE INSTRUCTION. |

FIGURE 7

```
     FIRST LINE       CMP    VAR, NUM
     SECOND LINE      MOV    AX, IMM1
     THIRD LINE       JZ     PW
     FOURTH LINE      MOV    AX, IMM2
     FIFTH LINE PW:   MOV    PORT, AX
```

FIGURE 8

CENTRAL PROCESSING UNIT DETECTING AND JUDGING WHETHER OPERATION RESULT EXECUTED BY ALU IN RESPONSE TO A FIRST INSTRUCTION CODE MEETS A PREDETERMINED CONDITION

FIELD OF THE INVENTION

This invention relates to a central processing unit, particularly, to a single-chip microcomputer with a central processing unit with a decreased ROM size and execution time.

DESCRIPTION OF THE RELATED ART

In a single chip microcomputer, such as a computer used for controlling an electric home appliance, a process is often carried out to set a first value or a second value in an external register by checking whether a predetermined condition is true or false. For example, FIG. 8 shows an example of an assembly language program to execute such a process. Based on this program, a value IMM1 or a value IMM2 is outputted to the external register at a memory address PORT when a variable VAR is either equal or not equal to a value NUM.

An explanation of the instruction in each line of FIG. 8 is as follows. In the first line of the program, a comparison is made between the variable VAR and an immediate NUM. The central processing unit includes an arithmetic logic unit (ALU) which performs the comparison and a zeroflag. If the two values are equal, a value of one is written in the zeroflag. If the two values are not equal, a value of zero is written in the zeroflag.

In the second line, a value IMM1 is loaded to a register AX among a plurality registers in the central processing unit. During the third line, the execution of the central processing unit is jumped to the fifth line when the result of the comparison between the variable VAR and the immediate NUM in the first line is equal, i.e., when the zeroflag stores the value of one. A value of IMM2 is loaded in a register AX during the execution of the fourth line. In other words, the immediate IMM1 loaded during the second line is changed to the immediate IMM2 if a value of zero is stored in the zeroflag. In the fifth line, the content loaded in the register AX (the immediate IMM1 or IMM2) is outputted to an address location PORT of an external register. In other words, the immediate IMM1 is stored in the external register when the variable VAR is equal to the immediate NUM, and an immediate IMM2 is stored in the external register when the two values are not equal to each other.

In the conventional central process unit, a jump instruction such as shown in the third line of the FIG. 8 is needed in order to execute a process to load a different immediate to a register, or the like, depending on a predetermined condition. As a result, the size of the program tends to be large and a load instruction is required to change the immediate subsequently. Further, when the jump instruction is used, a micro instruction following the jump instruction is fetched after the judgement of the condition, so that pipe-lined processing is disrupted in the central processing unit, which extends the execution time of the central processing unit.

SUMMARY OF THE INVENTION

It is an object of the present invention to solve the aforementioned problems, and to provide a high speed central processing unit which executes a process defined to output different values to an internal or an external register, memory, or the like depending on a condition, by a small program.

An aspect of this invention is a central processing unit (CPU) comprising a detecting means for detecting and judging whether the operation result executed by an ALU in accordance with a first instruction code fulfills a predetermined condition. The CPU also includes a memory means which is designated as an operand by a second instruction code, and a controlling means which inputs to the memory means either the first immediate or the second immediate of the second instruction code in accordance with a judgement of the detecting means.

Another aspect of the present invention is a central processing unit comprising a first memory means which stores either a first or a second conditional value, respectively, when the result of an operation does or does not fulfill a predetermined condition, a second memory means which is designated as an operand by the second instruction code, and a controlling means which controls the second memory means to store either a first immediate or a second immediate of the second instruction code, respectively, when either the first conditional value or the second conditional value is stored in the first memory means.

In the central processing unit constructed in accordance with the present invention, a second instruction code includes first and second immediates, and the first and second immediates are stored in a memory means. Hence, a program to store a different immediate, depending on the condition, is simple, and the execution time is reduced without disordering or disrupting a pipe-lined processing of the CPU.

Further, a first conditional value or a second conditional value is stored in the first memory means, respectively, when the operation result does or does not fulfill a predetermined condition. The first immediate or the second immediate of the second instruction is stored in a second memory means, respectively, when the first conditional value or the second conditional value is stored in the first memory. Hence, a program to store a different immediate, depending on the condition, is simple, and the execution time is reduced without disordering or disrupting a pipe-lined processing by the CPU.

Additional objects, advantages and other features of the invention will be set forth in part in the description which follows and in part will become apparent to those having ordinary skill in the art upon examination of the following or may be learned from the practice of the invention.

BRIEF DESCRIPTION OF THE DRAWINGS

The invention will be described in detail with reference to the following drawings in which like reference numerals refer to like elements.

FIG. 2 shows an example of an assembly language program instruction executed by the CPU in accordance with the first embodiment of the present invention.

FIG. 3 illustrates an instruction code of the conditional load instruction shown in line 2 of FIG. 2.

FIG. 4 shows an example of a three step micro instruction microprogram of the conditional load instruction shown in line 2 of FIG. 2.

FIG. 5 shows an example of another assembly language program instruction executed by the CPU in accordance with a second embodiment of the present invention.

FIG. 6 illustrates an instruction code for a conditional load instruction in line 2 of FIG. 5.

FIG. 7 illustrates a five step micro instruction of the conditional load instruction of FIG. 5.

FIG. 8 shows an example of a program instruction executed by a conventional CPU.

DESCRIPTION OF THE PREFERRED EMBODIMENTS

Figure 1:
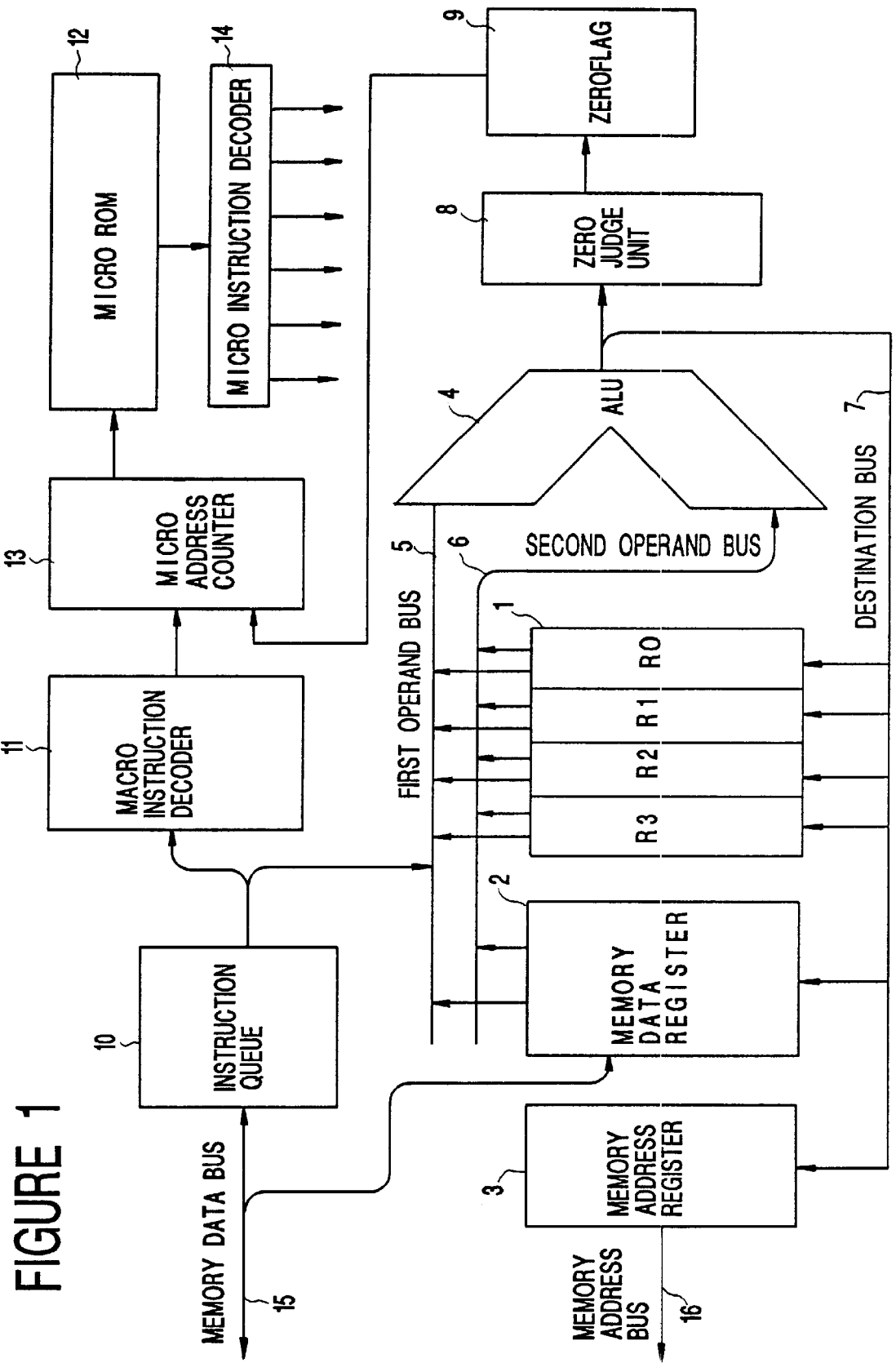
FIG. 1 illustrates a schematic block diagram of a central processing unit of the present invention.

FIG. 1 illustrates a schematic block diagram of a central processing unit of the present invention. In FIG. 1, a group of registers 1 is composed of four registers R0 through R3. A memory data register 2 stores temporarily the data feeded to or from an external memory or register (not shown in the FIG. 1). A memory address register 3 designates the address of the external memory or register. A memory data bus 15 transfers data to or from the designated external memory or register. A memory address bus 16 transfers address of the external memory or register outside of the CPU.

The first and second operand busses 5 and 6 connect registers R0–R3 and memory data register 2 to an arithmetic logic unit (ALU) 4. The ALU 4 performs a prescribed operation between the operands provided on the first and second operand busses 5 and 6 from the registers R0–R3 and memory data register 2. The ALU 4 outputs the operation result on a destination bus 7, and the operation result is written in one of the registers R0–R3, the memory register 2 or the memory address register 3 via the destination bus 7.

A zero judge unit 8 detects whether or not the operation result fed through destination bus 7 is zero. A zeroflag 9 stores a one when the zero judge unit 8 detects a value of zero from the operation result. Otherwise, the zeroflag 9 stores a value of one. An instruction queue 10 stores a macro instruction which is prefetched from time to time from an external memory. A macro instruction decoder 11 decodes the macro instruction from the instruction queue 10.

A micro ROM 12 stores micro instruction to activate the CPU to carry out the macro instruction from instruction queue 10. A micro address counter 13 designates an address of the micro ROM 12 in response to the macro instruction decoder 11. A micro instruction decoder 11 decodes the micro instruction read out from the micro ROM 12 and generates various control signals to control the operation of the CPU.

FIG. 2 shows an example of a program written in an assembly language which is to be carried out by the CPU. This program has three macro instructions and instructs the CPU to compare the variable VAR and the immediate NUM. The CPU load the external memory or register with an immediate IMM1 when the two values of the variable VAR and immediate NUM are equal, and an immediate IMM2 when the two values are not equal. The program instruction and the function of the CPU to execute the program is explained hereinafter.

The macro instruction in the first line of the program instructs the CPU to compare a variable VAR and an immediate NUM. An opcode (i.e. operation code or instruction code) CMP of this macro instruction is fed to a macro instruction decoder 11 from the instruction queue 10. The macro instruction decoder 11 decodes this opcode. In response to the macro instruction decoder 11, the micro address counter 13 sends to the micro ROM 12 the addresses of the micro instruction stored in the micro ROM 12 to carry out the macro instruction. The micro ROM 12 outputs the micro instruction from the designated address, and the micro instruction is decoded by the micro instruction decoder 14.

Based on the micro instruction, the variable VAR from the external register (designated by the instruction code of the macro instruction shown in the first line) is outputted to the second operand bus 6. Further, the immediate NUM in the same instruction code from the instruction queue 10 is outputted to the first operand bus 5. The two values of the variable VAR and immediate NUM is fed to the ALU 4 and compared in the ALU 4. When the two values are equal, the zero judge unit 8 detects the equality, and loads a value of one to the zeroflag 9. When the two values are not equal, the zero judge unit 8 detects the inequality and loads a value of zero to the zeroflag 9.

The macro instruction in the second line of the program instructs the CPU so that the register R0 stores either the immediate IMM1 when the value stored in the zeroflag 9 is one or the immediate IMM2 when the value stored in the zeroflag 9 is zero. FIG. 3 shows an example of the instruction code of the conditional load instruction which is prefetched in the instruction queue 10. The conditional load instruction includes an opcode 20, a register designation 21A which designates R0–R3 as the designation register, the first immediate IMM1 and the second immediate IMM2. FIG. 4 shows an example of the three step micro instruction which is stored in the micro ROM 12, as a micro program, to execute the conditional load instruction.

Prior to the execution of the conditional load instruction, the opcode 20 of the conditional load instruction is outputted to the macro instruction decoder 11 at the last step of the micro instruction to execute the former instruction (the first line of FIG. 2). The micro instruction decoder 11 decodes the opcode 20 and recognizes that the instruction is a conditional load instruction. The macro instruction decoder 11 outputs an address where the first step of the three step micro instruction, as shown in FIG. 4, is stored in the micro ROM 12 as a micro program.

The micro address counter 13 outputs the address from the macro instruction decoder 11 to the micro ROM 12. The micro ROM 12 outputs the first step of micro instruction stored in the designated address to the micro instruction decoder 14. The micro instruction decoder 14 decodes this micro instruction, and generates various control signals. Based on the control signals, the instruction queue 10 transfers the first immediate IMM1 to the destination register R0 designated by the register designation 21A of the instruction code via the first operand bus 5, the ALU 4 and the destination bus 7. Further, the instruction queue 10 outputs to the micro address counter 13 either (1) the address where the third step of the micro instruction is stored in the micro ROM 12 when the value stored in the zeroflag 9 is one, or (2) the address where the second step of the micro instruction is stored in the micro ROM 12 when the value stored in the zeroflag 9 is zero.

If the value stored in the zeroflag 9 is zero, the second step of the micro instruction is outputted from the micro ROM 12 to the micro instruction decoder 14. The control signals generated by the micro instruction decoder 14 causes the instruction queue 10 to transfer the second immediate IMM2 to the destination register R0, and the micro address counter 13 to load the address where the third step of the micro instruction is stored in the micro ROM 12.

If the value stored in the zeroflag 9 is one or after the execution of the second step of the micro instruction, the third step, as shown in FIG. 4, is executed. The third step of the micro instruction cause the instruction queue 10 to output the opcode of the next instruction to the macro instruction decoder 11. Since the last step has been executed, the process for the conditional load instruction is terminated.

The macro instruction in the third line of the program, as shown in FIG. 2, controls the operation of the CPU such that the macro instruction in the instruction queue 10 is executed in the same manner as stated above. In accordance with the macro instruction MOV, the address PORT designated by the macro instruction is transferred to the memory address register 3 from the instruction queue 10 via the first operand bus 5, and the IMM1 or the IMM2 stored in the designated register R0 is transferred to the memory data register 2 via the second operand bus 6. Further, the immediate stored in the memory data register 2 is transferred to a location in the external register (not shown in FIG. 1) whose address is stored in the memory address register 2.

As described above, a different immediate (the first or second immediate) is chosen depending on the true-false state of a certain condition such as whether the variable VAR is or is not equal to the immediate NUM. The first and third lines of the program in FIG. 2 are the same with the first and fifth lines of FIG. 8, and the operation of the CPU is execution of those lines is also the same as FIG. 8. However, the program size is reduced greatly because the conditional jump instruction (the third line) and the two immediate load instruction (the second and fourth lines) in FIG. 8 are replaced by a conditional load instruction (the second line) of FIG. 2. Further, since the choice of the immediates to be stored is altered in response to the stored content of the zeroflag 9 by the control of the micro instruction, the execution time is reduced greatly compared to FIG. 8, where the conditional jump instruction is used as a macro instruction.

FIGS. 5 illustrates another embodiment for controlling the operation of the CPU. In the FIG. 2 embodiment, an instruction to write an immediate in a destination register was set in the second line of FIG. 2, and the immediate was transferred to the external register in the third line of FIG. 2. However, as shown in FIG. 5, an immediate can be loaded directly to a location in the external register at an address PORT. The explanation of the program instruction and the operation to execute the program are as follows.

The macro instruction in the first line of the program instructs the CPU to compare a variable VAR with an immediate NUM. The operation of the CPU is the same as that of the foregoing embodiment in FIG. 2 and is omitted. When the micro instruction in the second line of the program is executed, an immediate IMM1 is stored at an address PORT of an external register when the value stored in the zeroflag 9 is one or an immediate IMM2 is stored at the address PORT of the external register when the value stored in the zeroflag 9 is zero.

FIG. 6 illustrates an instruction code for a conditional load instruction of the second line in FIG. 5. Unlike the instruction code of FIG. 2, the FIG. 5 instruction code includes a memory address 21B of the external memory or register. FIG. 7 illustrates a five-step micro instruction to execute this conditional load instruction in the CPU. The five-step micro instruction is stored in the micro ROM 12. The five-step micro instruction corresponds to the conditional load instruction which is outputted from the instruction queue 10, and processed by the CPU in a way similar to the foregoing embodiment, e.g., the micro instruction is decoded by the micro instruction decoder to control the operation of CPU.

In the first step of FIG. 7, the memory address 21B is transferred from the instruction queue 10 to the memory address register 3 via the first operand bus 5, the ALU 4 and destination bus 7. In the second step, the first immediate 22 from the instruction queue 10 is transferred to the memory data register 2 via the first operand bus 5, ALU 4 and the destination bus 7. The micro address counter 13 loads either (1) the micro instruction address set forth in the fourth step of the micro instruction when the value stored in the zeroflag 9 is one or (2) the micro instruction address set forth in the third step of the micro instruction when the value stored in the zeroflag 9 is zero.

If the value stored in the zeroflag 9 is zero, the third step of the micro instruction is executed. The second immediate 23 is transferred and written to the memory data register 2 in lieu of the first immediate 22. Thereafter, the address where the fourth step is stored in the micro ROM 12 is loaded in the micro address counter 13.

On the other hand, when the value stored in the zeroflag 9 is one or after the execution for the third step, the fourth step of the micro instruction is executed such that the content stored in the memory data register 2 is transferred to the external register (or memory) designated by the memory address 21B. In the fifth step of the micro instruction, the instruction queue 10 outputs the opecode of the next instruction to the macro instruction decoder 11, and the conditional load instruction is terminated.

By controlling the central processing unit in a manner described above, the first immediate or the second immediate is outputted to the external register or memory depending on whether or not a predetermined condition is fulfilled. Hence, the size of the program is further reduced. The immediate need not be stored temporarily in the internal register R0–R3, as in the first embodiment, so that the execution time is further decreased.

The present invention provides a controlling means, in which the first and the second immediate is set in the second instruction, and the first or the second immediate is stored in the memory designated by the second instruction depending on whether the operation result operated by the first instruction fulfills a prescribed condition. Hence, a reduction in a program size is realized, and the size of the memory, such as a ROM, is reduced.

While the present invention has been described in specific embodiments thereof, it is evident that many alternatives, modifications and variations will be apparent to those skilled in the art. Hence, it is understood that the present invention may be practiced otherwise than as specifically described within the scope of the appended claims.

What is claimed is:

1. A central processing unit comprising:
   an arithmetic logic unit (ALU) to execute an operation instructed by a first instruction code to output a first operation result;
   means for determining whether the operation result of said ALU fulfills a predetermined condition; and
   means for controlling a memory means to store a first immediate value or a second immediate value of a second instruction code, said memory means being designated as an operand by the second instruction code, wherein the first immediate value and the second immediate value are both contained in the same second instruction code, and
   wherein said controlling means controls said memory means to store either the first or the second immediate value based on a determination by said determining means as to whether the operation result of said ALU fulfills the predetermined condition.

2. The central processing unit of claim 1, wherein said memory means designated as the operand by the second instruction code is a register or a memory external to the central processing unit.

3. The central processing unit of claim 1 further comprising an instruction queue for storing first and second instructions, which are prefetched from the memory means.

4. The central processing unit of claim 1 further comprising a plurality of registers, wherein one of said registers is selected to temporarily store one of said first and second immediate values.

5. The central processing unit of claim 1, wherein said determining means comprises means for detecting the first operation result, and means for storing a predetermined value based on the detected first operation result.

6. The central processing unit of claim 1, wherein the operation of said ALU is a comparison operation between a first and second data, and said determining means determines an equality or an inequality of the first and second data based on the first operation result.

7. The central processing unit of claim 6, wherein the determining means comprises a zero judge unit and a zeroflag, said zero judge unit detecting the equality or inequality to output a value of one or zero, respectively, to said zeroflag.

8. The central processing unit of claim 6 further comprising a plurality of registers, wherein one of said registers is selected to temporarily store one of said first and second immediate values.

9. The central processing unit of claim 8, wherein one of said registers stores the first immediate value which is transferred to said memory means if there is equality between the first and second data.

10. The central processing unit of claim 9, wherein the first immediate value is replaced with the second immediate value in one of said registers if there is inequality between the first and second data, and said second immediate value being transferred to said memory means.

11. A central processing unit comprising:
an arithmetic logic unit (ALU) to execute an operation instructed by a first instruction code to output a first operation result;
means for determining whether the operation result of said ALU fulfills a predetermined condition;
first memory means for storing one of a first conditional value or a second conditional value based on a determination of said determining means as to whether the predetermined condition is fulfilled;
means for controlling a second memory means to store one of a first immediate value and second immediate value of a second instruction code, said second memory means being designated as an operand by the second instruction code, wherein the first immediate value and the second immediate value are both contained in the same second instruction code, and
wherein said controlling means controls said second memory means to store one of the first immediate value and the second immediate value, respectively, when the first conditional value or the second conditional value is stored in the first memory means.

12. The central processing unit of claim 11, wherein said second memory means designated as the operand by the second instruction code is a register or a memory.

13. The central processing unit of claim 11, wherein said second memory means designated as the operand by the second instruction code is a register or a memory external to the central processing unit.

14. The central processing unit of claim 11, further comprising an instruction queue for storing first and second instructions, which are prefetched from the memory means.

15. The central processing unit of claim 11 further comprising a plurality of registers, wherein one of said registers is selected to temporarily store one of said first and second immediate values.

16. The central processing unit of claim 11, wherein said determining means comprises means for detecting the first operation result, and means for storing a predetermined value based on the detected first operation result.

17. The central processing unit of claim 11, wherein the operation of said ALU is a comparison operation between a first and second data, and said determining means determines an equality or an inequality of the first and second data based on the first operation result.

18. The central processing unit of claim 17, wherein the determining means comprises a zero judge unit, said zero judge unit detecting the equality or inequality to output the first conditional value of one or the second conditional value of zero, respectively, to said first memory means.

19. The central processing unit of claim 17 further comprising a plurality of registers, wherein one of said registers is selected to temporarily store one of said first and second immediate values.

20. The central processing unit of claim 19, wherein one of said registers stores the first immediate value which is transferred to said memory means if there is equality between the first and second data.

21. The central processing unit of claim 20, wherein the first immediate value is replaced with the second immediate value in one of said registers if there is inequality between the first and second data, and said second immediate value being transferred to said second memory means.

* * * * *